United States Patent [19]

Liebler

[11] Patent Number: 4,495,322

[45] Date of Patent: Jan. 22, 1985

[54] SILICONE RESIN COATING AGENT

[75] Inventor: Ralf Liebler, Darmstadt, Fed. Rep. of Germany

[73] Assignee: Röhm GmbH, Darmstadt, Fed. Rep. of Germany

[21] Appl. No.: 586,632

[22] Filed: Mar. 5, 1984

Related U.S. Application Data

[63] Continuation of Ser. No. 411,641, Aug. 26, 1982, abandoned.

[30] Foreign Application Priority Data

Sep. 5, 1981 [DE] Fed. Rep. of Germany ....... 3135241

[51] Int. Cl.$^3$ ................................. C08K 5/16
[52] U.S. Cl. ..................................... 524/198; 524/96; 524/588; 524/726; 524/728; 524/838; 528/12; 528/21; 528/38
[58] Field of Search ............... 524/396, 398, 399, 588, 524/96, 198; 528/12, 21, 38

[56] References Cited

U.S. PATENT DOCUMENTS

| | | | |
|---|---|---|---|
| 2,902,468 | 9/1959 | Fianu . | |
| 2,945,838 | 7/1960 | Prober | 260/45.9 |
| 4,026,720 | 5/1977 | Ikeda | 106/287 SB |
| 4,208,312 | 6/1980 | Okada et al. | 528/12 |

FOREIGN PATENT DOCUMENTS

| | | | |
|---|---|---|---|
| 174998 | 5/1953 | Austria . | |
| 2522241 | 11/1976 | Fed. Rep. of Germany . | |
| 7415621 | 4/1974 | Japan . | |
| 1040147 | 11/1963 | United Kingdom | 528/21 |
| 1372061 | 10/1974 | United Kingdom . | |

OTHER PUBLICATIONS

Encyclopedia of Industrial Chemical Analysis, vol. 8, p. 598, Interscience Publishers, New York.
Doolittle, "The Technology of Solvents and Plasticizers", p. 736, John Wiley & Sons, New York.
Unger et al., "Controlled Porosity, etc.", J. Colloid Interface Sc. 55 (2), 377–380 (1976).
Chem. Abstr. 54, 14778.
Chem. Abstr. 62, 32646 z.

Primary Examiner—Joseph L. Schofer
Assistant Examiner—J. M. Reddick
Attorney, Agent, or Firm—Curtis, Morris & Safford

[57] ABSTRACT

What are disclosed are coating formulations of improved storage stability comprising a silicone resin prepared by the condensation of partially hydrolyzed organo-silicon compounds in the presence of an acid, said coating formulations containing an amide of an alkanoic acid having up to 22 carbon atoms or an amide of benzoic acid, optionally substituted, or a carbamic acid ester having an alkyl group containing up to 18 carbon atoms or having a phenyl or naphthyl group, optionally substituted, in the ester part, or containing ureas or lactams, or mixtures thereof.

9 Claims, No Drawings

SILICONE RESIN COATING AGENT

This application is a continuation, of application Ser. No. 411,641, filed 8/26/82, now abandoned.

The present invention relates to coating formulations having very high storage stability and comprising a silicone resin in an aqueous/organic solution.

Condensation products of partially hydrolyzed organosilicon compounds find use in industry as coating compositions, particularly for glass and plastics.

The partial hydrolysis of the organosilicon compounds is generally carried out by acid hydrolysis with a sufficient amount of water. As a rule, the precondensate is formed at elevated temperature. Coating is usually followed by curing, mostly by tempering at elevated temperature. From German Pat. No. 25 22 241, coating agents are known which are produced by hydrolyzing siloxanes, formed of four different components, with acetic acid, a precondensate being then obtained through heat treatment. The addition to the coating agents of metal salts of naphthenic acids as catalysts is recommended as improving their pot life. It is also known that the pot life of coating materials containing metal salts as curing catalysts can be improved still further by converting them into complex compounds. [cf. W. Krauss and R. Kubens in "Deutsche Farben-Zeitschrift" 10, 1–7 (1956)].

In particular, 1,2-,1,3-, and 1,4-dioxo or oxyoxo compounds, for example, acetylacetone, acetoacetic ester, malonic acid, and especially diacetyl are recommended for complexing. Certain amines also have a positive effect, which in part is likewise attributed to complex formation; however, in many applications amines are not suited for practical use because the coatings tend to yellow, because of the risk of gelatinization, and because of the large amounts of amines which must be added. Krauss et al. divide the metallic curing catalysts into two groups on the basis of their action: the strong-acting accelerators lead, aluminum and calcium, and the weak-acting accelerators iron, zinc, cobalt, manganese, and titanium. A combination of metals from both groups is reported to be particularly effective, especially when the weak-acting metals are present in excess. According to Krauss et al., only substances amenable to complex formation which preferentially bind the strong-acting curing accelerator rather than the weak-acting one should be used. Often the thermal stability of the applied coatings poses a problem. The storage stability of the coating agents, and especially of those incorporating curing catalysts, is also in need of improvement. Thus there has been a need for improving the storage stability of coating agents incorporating curing catalysts without reducing the effectiveness of the curing catalysts.

It has now been found that the storage life of coating formulations comprising silicone resins which have been prepared by the condensation of partially hydrolyzed organo-silicon compounds in the presence of acids is substantially improved when said coating formulations contain amides of the formula

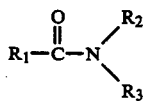

(I)

wherein $R_1$ is hydrogen, linear or branched alkyl having from 1 to 22 carbon atoms, and in particular $C_1$ to $C_6$ and $C_{12}$ to $C_{18}$ alkyl, especially staight-chain alkyl groups, or phenyl, optionally substituted, or —$OR_4$, wherein $R_4$ stands for alkyl having from 1 to 18 carbon atoms, or for phenyl or naphthyl, optionally substituted, or $R_1$ is —$NR_2'R_3'$ wherein $R_2'$ and $R_3'$ may have the same meaning as $R_2$ and $R_3$ but are independent thereof, and wherein $R_2$ and $R_3$ are the same or different and are hydrogen or alkyl having from 1 to 4 carbon atoms, or wherein $R_2$ and $R_3$, taken together with the nitrogen atom, or $R_1$ and $R_3$, taken together with the bridging nitrogen and carbonyl carbon atoms, form a five-, six-, or seven-membered heterocycle optionally carrying further nitrogen or oxygen atoms in the ring, or contain mixtures of such amides.

As substituents on the phenyl group, nitro, alkyl, alkoxy, hydroxy, amino, sulfonic acid, halogen, or further phenyl groups are particularly suitable, with the carbon number of the substituents all together not exceeding $C_{22}$. The amino groups themselves may be substituted and, in particular, alkylated.

Particularly preferred are compounds of the general formula I wherein $R_1$ is hydrogen or alkyl having 1 to 6 carbon atoms, i.e. methyl, ethyl, propyl, butyl, pentyl, or hexyl, including their branched isomers, but preferably the straight-chain compounds, and wherein $R_2$ and $R_3$ are hydrogen, methyl, or ethyl, as well as the compounds wherein $R_1$ signifies —$OR_4$ and $R_4$ stands for ethyl, and wherein $R_2$ and $R_3$ stand for hydrogen, methyl, or ethyl.

Formamide, dimethyl formamide, acetamide, dimethyl acetamide, propionamide, and especially acetamide, propionamide, and n-butyramide, as well as carbamic acid ethyl ester and N-ethylcarbamic acid ethyl ester, are particularly well suited. Other amides that can be used to advantage are methyl formamide, diethyl formamide, i-butyramide, pivalic acid amide and stearic acid amide, etc. The morpholinides and piperidines of the $R_1$ CO— groups encompassed by the invention are also suitable.

The content of the amides to be added in accordance with the invention, for example the amides of the formula I, ranges from 0.01 to 1 mole, and preferably from 0.05 to 0.5 mole, and especially from 0.16 to 0.22 mole, per mole of organosilicon compounds present in the coating formulation. The water content of the coating formulations of the invention usually ranges from 5 to 20 weight percent, and more particularly from 10 to 15 weight percent, and especially 13±2 weight percent, based on the total coating formulation. The amides of the formula I may be already added to the formulations in accordance with the invention in the preparation of the condensation products from partially hydrolyzed organosilicon compounds or, preferably, to compositions which already contain the condensation resins in a carrier phase, in other words, to the prior-art compositions, for example. They may be added in the usual manner, preferably by stirring them in optionally together with other solvents.

The organosilicon compounds known from the prior art, such as the alkyltrialkoxysilanes, dialkyldialkoxysilanes, tetraalkoxysilanes, and the similarly used aromatically substituted silanes, as well as the similarly used functionally substituted organosilicon compounds, are suited for use in the preparation of the coating formulations in accordance with the invention. Among these are, for example, compounds of the formula

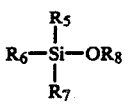
(II)

wherein $R_5$, $R_6$ and $R_7$ are, independently of one another, $-(O)_nR_9$ where $R_8$ and $R_9$ are alkyl having from 1 to 5 carbon atoms, or vinyl, allyl, or phenyl, preferably methyl or ethyl, and n signifies zero or one, or wherein $R_8$ and/or $R_9$ are $H[NH-(CH_2)_{m'}-]_p-NH(CH_2)_m-$, with m and m' representing an integer from 1 to 6, and p is zero or one, or wherein $R_8$ and/or $R_9$ are

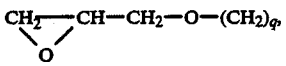

q signifying an integer from 1 to 6, or $R_8$ and/or $R_9$ are

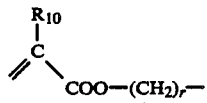

wherein $R_{10}$ is hydrogen or methyl and r represents an integer from 1 to 6, with the proviso that when $R_8$ and $R_9$ are not alike then one of them is alkyl having from 1 to 5 carbon atoms, or is vinyl, allyl, or phenyl.

The aqueous coating formulations in accordance with the invention are prepared by hydrolysis, preferably catalyzed by acids, of the organosilicon compound, in particular those of formula II, with an amount of water sufficient for hydrolysis, that is to say, 0.5 mole or more of water per mole of the groups to be hydrolyzed, for example the alkoxy groups. The acids to be added may be inorganic acids such as hydrochloric acid, sulfuric acid, phosphoric acid, nitric acid, etc., or organic acids such as carboxylic acids, organic sulfonic acids, etc., or acidic ion exchangers, the pH of the hydrolysis reaction being as a rule between 2 and 4.5, preferably 3.

Generally a temperature rise will be observed after the reactants have been brought together. In some cases it may be necessary to add heat to start the reaction, for example by heating the mixture to a temperature ranging from 40° to 50° C. It is advisable to provide that the reaction temperature does not exceed 55° C. The reaction time generally is fairly short, usually less than one hour, for example 45 minutes. For further processing, part of the water-alcohol mixture and of the volatile acids is best distilled off under vacuum. Suitable organic solvents, for example, alcohols, such as ethanol, methanol, isopropanol or n-butanol, ethers such as ethylene glycol or propylene glycol, as well as the ether esters of these compounds, hydrocarbons such as aromatic hydrocarbons or ketones such as acetone or methyl ethyl ketone, may then be used to achieve a solids content of about 15 to 35 weight percent. 2-propanol is particularly preferred as a solvent.

It has further proved advantageous to add to the formulations solvents which normally partially dissolve the synthetic resin that may serve as a substrate for the coating. For example, when polymethyl methacrylate (PMMA) is used as a substrate, it is advisable to add solvents such as toluene, acetone, or tetrahydrofuran in amounts equal to from 2 to 40 percent of the total weight of the formulations. The water content of the formulations in accordance with the invention is generally set at 5 to 20 weight percent, and preferably at 13±2 weight percent, based on the total weight of the formulations.

The pH value of the aqueous coating formulations of the invention should range from 3 to 6 and preferably from 4.5 to 5.5. It has been found that over that range there is very little condensation during storage. Said pH range can be obtained in known manner, for example by the addition of suitable bases such as alkali metal, alkaline earth metal, or ammonium hydroxides, optionally in an alcohol solution, or of corresponding metal salts of weak acids such as the carbonates or acetates. Buffer systems, for example, a buffer solution of acetic acid and potassium hydroxide, may be used within said pH range. Particularly advantageous is an embodiment in which higher carboxylic acids, and in particular carboxylic acids having from 8 to 12 carbon atoms, are contained in the coating formulations in amounts ranging from 0.01 mole to 1 mole of acid per mole of the hydrolyzable organosilicon compounds, such as the compounds of formula II.

If higher carboxylic acids as defined above have not already been added for the purpose of hydrolysis, one or more higher carboxylic acids may be added to the formulation prior to storage in such an amount that from 0.05 to 0.2 mole, and preferably from 0.1 to 0.15 mole, of higher carboxylic acid is used per mole of silane.

Curing catalysts in the form of zinc compounds, for example, and/or other metal compounds such as cobalt, copper, barium, or calcium compounds, or optionally, mixed catalysts, and in particular their octoates or naphthenates, are advantageously added to the coating formulations in accordance with the invention. The amount of these curing catalysts usually is from 0.1 to 2.5 weight percent, and more particularly from 0.2 to 2 weight percent, based on the total coating formulation. Examples are zinc naphthenate, octoate, acetate, sulfate, etc.

The coating formulations so obtained possess very good curing characteristics along with excellent storage stability. They will harden in a relatively short time, for example within 4 to 6 hours and usually within about 5 hours, and at a relatively low temperatures ranging, for example, from 90° to 100° C., and preferably at about 100° C., to form highly abrasion resistant and adherent coatings.

The formulations in accordance with the invention are suitable for coating solid synthetic resin surfaces, for example of glasslike substrates, in particular of synthetic polymers comprising an acrylic resin such as polymethyl methacrylate and its various modifications, polycarbonate, melamine-formaldehyde resins, polystyrene, poolyvinyl chloride, polyethylene, polypropylene, and polytetrafluoroethylene.

Within certain limits, the proper coating weight depends on the substrate to be coated. As a rule the coating weight, expressed as a weight of solids, will range from 2 to 6 g/m². The coating thickness will generally range from 0.25 to 25 microns.

The substrates may be coated, for example, by dipping and controlled withdrawal from the solution of the surfaces being coated. Withdrawal may be effected at a rate ranging from 10 to 40 cm/min. Coating methods such as spray coating, flow coating, and fluidized bed coating are also applicable.

The substrates so coated are cured in an appropriate manner, preferably by tempering at an elevated temperature, generally 80° to 100° C., for 2 to 6 hours, and preferably for about 5 hours, in a drying oven.

The surface coatings obtained by the use of the coating formulations of the invention possess extremely high abrasion resistance, high adhesive strength, durability, thermal stability, resistance to crazing, gloss, resistance to water and solvents, optical uniformity, and the like.

The coating formulations in accordance with the invention are further distinguished by extremely good storage stability, usually for more than 40 days at 30° C.

A better understanding of the present invention and of its many advantages will be had from the following:

Testing Methods

For acceleration of the storage stability test, the formulations were stored at 30° C.

Dip coating was followed by a 5-hour cure at 100° C.

Abrasion resistance was determined by rubbing with No. 00 steel wool.

Adhesion was determined by means of the grating-cut test in conformity with DIN 53 151.

EXAMPLES 1-14

1000 g of methyltriethoxy silane are hydrolyzed with 454 g of water and 50 g of glacial acetic acid. The temperature is held below 50° C. After ¾ hour, 865 g of the ethanol/water mixture was distilled off under vacuum, the residue is diluted with 555 g of i-propyl alcohol and 57 g of toluene, and the water content is adjusted to 13%. 6.3 g of zinc octoate are added as a curing catalyst. For adjustment of the pH, 25 g of 3.5% methanolic potassium hydroxide solution are added.

The batch is then divided into 130 g portions, which are mixed with various amides and carbamic acid derivates. The results are given in following Table I. The results obtained with acetylacetone (Example 13) and without anything added (Example 14) are given for comparison.

Test sheets of PMMA, PC, PVC and polystyrene are dip coated with the coating solutions and cured afterwards at the appropriate temperatures (eg. five hours at 100° C. for PMMA).

TABLE I

| Example | Carboxylic acid amide | Carbamic acid compound | Coating solutions curable to form abrasion-resistant coating when stored at 30° C. for (days) | Good adhesion when stored at 30° C. for (days) |
|---|---|---|---|---|
| 1 | 5.1 g formamide | — | 15 | >20 |
| 2 | 6.5 g N—methyl-formamide | — | 14 | >20 |
| 3 | 8.3 g dimethyl formamide | — | 21 | >29 |
| 4 | 11.5 g diethyl formamide | — | 29 | >29 |
| 5 | 6.7 g acetamide | — | 40 | >40 |
| 6 | 9.6 g dimethyl acetamide | — | 20 | >25 |
| 7 | 8.3 g propion-amide | — | 45 | >45 |
| 8 | 9.5 g n-Butyric amide | — | 40 | >40 |
| 9 | 9.5 g i-Butyric amide | — | 14 | >20 |
| 10 | 11.1 g Pivalic amide | — | 17 | >25 |
| 11 | 31.0 g Stearic amide | — | 25 | >30 |
| 12 | — | 13.4 g ethyl-carbamic acid ethyl ester | 25 | >29 |
| 13 | 11.4 g acetyl-acetone | — | 11 | >29 |
| 14 | — | — | 6 | >15 |

Comparable results are obtained, when one uses the following mixtures of organosilicon compounds instead of 1000 g of methyltriethoxy silane:

760 g of methyltriethoxy silane plus 327 g of phenyltriethoxy silane, or 600 g of methyltriethoxy silane plus 117 g of dimethyldiethoxy silane plus 83 g of tetraethoxy silane, or 937 g of methyltriethoxy silane plus 90 g of methacryloyloxypropyltrimethoxy silane, or 903 g of methyltriethoxy silane plus 100 g of vinyltriethoxy silane, or 723 g of methyltrimethoxy silane plus 67 g of glydidyloxypropyltrimethoxy silane.

EXAMPLES 15-20

The following examples are carried out essentially as described in previous Examples 1-14.

After the water content of the composition (containing the partially condensed organosilicon compound plus the solvent) is adjusted to 13%, 67 g of acetamide are added.

The batch is then divided into 130 g portions, which are mixed with different curing catalysts selected from metal compounds as given in Table II below. The pH is adjusted to 5.2 with 2.6 g of 3.5% methanolic potassium hydroxide.

Sheets of PMMA or PC are dip coated with the formulation. Curing of the PMMA is performed at 100° C. for five hours. The curing of PC takes five hours at 120° C.

TABLE II

| Example | curing catalyst | Concentration of catalyst (% by weight) | Metal content | coating solutions curable to form abrasion-resistant coatings when stored at 30° C. for (days) | Good adhesion when stored at 30° C. for (days) |
| --- | --- | --- | --- | --- | --- |
| 15 | Cobalt naphthenate | 1.0 | 0.08 | 32 | >35 |
| 16 | Copper naphthenate | 1.1 | 0.09 | 14 | >20 |
| 17 | Zinc naphthenate | 1.1 | 0.09 | 40 | >40 |
| 18 | OCTA SOLINGEN+ Trockner 123 aqua (1.2% Co, 3.2% Zn, 7.2% Ba) | 0.8 | 0.09 | 40 | >40 |
| 19 | OCTA SOLINGEN+ Trockner 203 | 0.8 | 0.09 | 40 | >40 |
| 20 | OCTA SOLINGEN+ Trockner 1330 | 1.2 | 0.09 | 40 | >40 |

+Commercially available from Gebr. Borchers, Goslar, Federal Republic of Germany

EXAMPLES 21-24

1000 g of methyltriethoxy silane are heated with 454 g of water and 50 g of a strongly acidic ion exchanger (Bayer "Lewatit SC 102") to about 45° C. until hydrolysis sets in. The temperature is then held below 55° C. After ¾ hour, about 663 g of the ethanol/water mixture are distilled off under vacuum, the residue is diluted with 242 g of n-butyl alcohol, 37 g of ethylene glycol, and 24 g of toluene, and the ion exchanger is filtered off. The water content is then adjusted to 14%. 5.5 g of zinc octoate are added as curing catalyst and 11 g of a 3.5% methanolic KOH solution are added for adjustment of the pH along with 94 g of 2-ethylhexanoic acid.

160 g portions of this solution are then mixed with 8 g of acetamide and 9.3 g of dimethylformamide (DMF) respectively.

In the comparative Examples (23 and 24), acetic acid is used in place of 2-ethylhexanoic acid.

The results are presented in Table II which follows.

TABLE III

| Example | Carboxylic acid amide | Carboxylic acid | Coating solutions curable to form abrasion-resistant coatings when stored at 30° C. for (days) | Good adhesion when stored at 30° C. for (days) |
| --- | --- | --- | --- | --- |
| 21 | Acetamide | 2-ethylhexanoic acid | 22 | >20 |
| 22 | DMF | 2-ethylhexanoic acid | 22 | >20 |
| 23 | Acetamide | Acetic acid | 20 | >20 |
| 24 | DMF | Acetic acid | 16 | >20 |

Comparable good results were also obtained with other properly use testing methods, for example, the Taber abrasion method (ASTM D 1044) and the sand trickle method (DIN 52 348 E).

The coating formulations in accordance with the invention retain the advantageous properties of comparable prior art coating materials. They may also incorporate additives known from the prior art, such as silica, titanium dioxide, UV-absorbers, dyes, pigments, antistatic agents, antioxidants, wetting agents, antifoaming agents, antifouling additives, and the like, in the amount commonly used. Surfaces coated with the formulations of the invention are easily cleaned.

What is claimed is:

1. An aqueous coating formulation having improved storage stability, said formulation having a pH between 3 and 6 comprising (A) a silicone resin condensation product prepared by condensing a partially hydrolyzed organosilicon compound in the presence of a catalytic amount of an acid and (B) from 0.01 to 1 mole, per mole of organosilicon compounds present in said coating formulation, of an amide of the formula

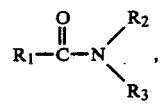

wherein
$R_1$ is hydrogen, linear or branched alkyl having 1 to 22 carbon atoms, phenyl, substituted phenyl, or —$OR_4$ where $R_4$ is alkyl having 1 to 18 carbon atoms, phenyl, naphthyl, or substituted phenyl or naphthyl, or $R_1$ is

where $R_2'$ and $R_3'$ are the same or different and have the same meanings as $R_2$ and $R_3$, defined below, and
$R_2$ and $R_3$, which are the same or different, taken alone are hydrogen, alkyl having from 1 to 4 carbon atoms, phenyl, or substituted phenyl, or wherein $R_2$ and $R_3$, taken together with the nitrogen atom, or $R_1$ and $R_3$, taken together with the bridging nitrogen and carbonyl carbon atoms, form a heterocycle having 5 to 7 members or such a heterocycle containing further nitrogen or oxygen atoms, and wherein said organosilicon compound which is condensed is a partial hydrolysis product of a compound of the formula

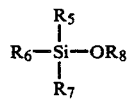

wherein
$R_5$, $R_6$ and $R_7$ independently of one another are —$(O)_nR_9$ where $R_8$ and $R_9$ are alkyl having from 1 to 5 carbon atoms, or vinyl, allyl, or phenyl and n is zero or one, or $R_8$ and/or $R_9$ are $H[NH-(CH_2)_{m'}]_p-NH(CH_2)_m-$, m and m' are each an integer from 1 to 6, and p is zero or one, or $R_8$ and/or $R_9$ are

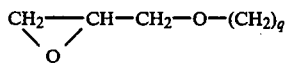

where q is an integer from 1 to 6, or
$R_8$ and/or $R_9$ are

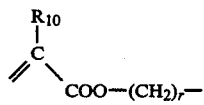

where $R_{10}$ is hydrogen or methyl and r is an integer from 1 to 6, with the proviso that when $R_8$ or $R_9$ are not alike one of them is alkyl having from 1 to 5 carbon atoms or is vinyl, allyl, or phenyl.

2. A coating formulation as in claim 1 wherein $R_1$ is hydrogen or alkyl having 1 to 6 carbon atoms and $R_2$ and $R_3$ are the same or different and are hydrogen, methyl, or ethyl.

3. A coating formulation as in claim 1 wherein $R_1$ is $-OR_4$, $R_4$ is ethyl, and $R_2$ and $R_3$ are the same or different and are hydrogen, methyl, or ethyl.

4. A coating formulation as in claim 1 wherein said amide is present in an amount from 0.05 to 0.5 mole based on each mole of organosilicon compounds present in the coating formulation.

5. A coating formulation as in claim 1 comprising from 5 to 20 percent of water by weight of the formulation.

6. A coating formulation as in claim 1 which additionally comprises from 0.01 to 1 mole of an alkane carboxylic acid having 6 to 21 carbon atoms per mole of said organosilicon compound.

7. A coating formulation as in claim 1 wherein $R_8$ and $R_9$ are methyl or ethyl.

8. A coating formulation as in claim 1 which additionally comprises a catalytic amount of a metal compound curing agent which is a compound or mixed compound of zinc, cobalt, copper, barium, or calcium.

9. A coating formulation as in claim 8 wherein said compound or mixed compound is an octoate or napthenate.

* * * * *